United States Patent Office 3,474,407
Patented Oct. 21, 1969

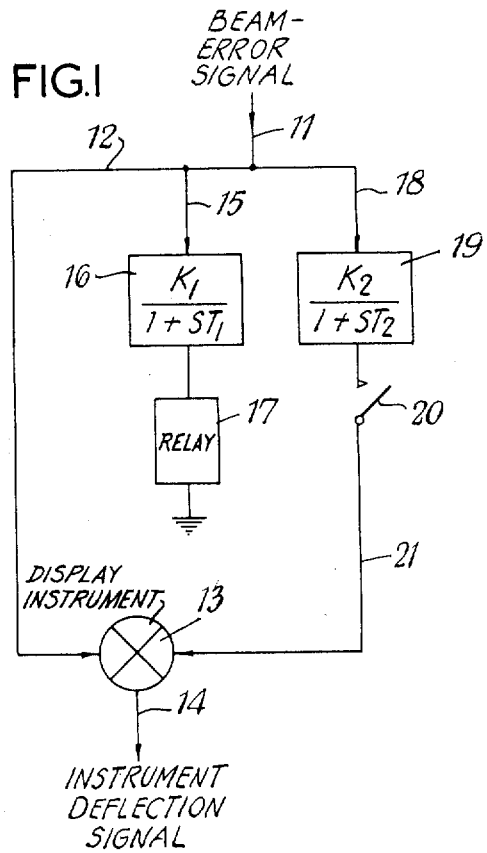
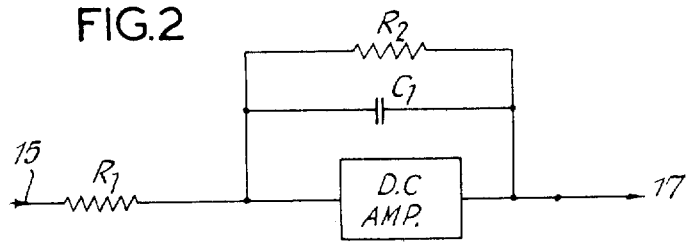

3,474,407
APPROACH AND LANDING SIGNALLING
SYSTEMS FOR AIRCRAFT
Colin J. Chesmond, London, England, assignor to Elliott
Brothers (London) Limited, London, England, a British
company
Filed Aug. 6, 1965, Ser. No. 477,887
Claims priority, application Great Britain, Aug. 6, 1964,
32,083/64
Int. Cl. G08g 5/00; G01s 1/16, 1/18
U.S. Cl. 340—27                                    17 Claims

ABSTRACT OF THE DISCLOSURE

In an aircraft controlled by auto-pilot on approach and landing, a display instrument is connected normally to display in proportion to beam error. The beam error signal is also connected to a switching device which responds to beam error signals emanating from auto-pilot failure; and is also connected to a long term error circuit. When the switching device is actuated, it connects the long term error circuit to the display instrument thereby suddenly increasing the deflection thereof by an amount proportional to the long term error and warning the pilot of auto-pilot failure.

---

This invention relates to approach and landing systems for aircraft.

In existing approach and landing systems the aircraft is kept flying along a beam by an auto-pilot and errors in following the beam are displayed. Existing instruments for displaying localiser and glide slope beam errors occuring during the aircraft landing approach generally have deflections proportional to beam error. The beam error signals generated by the localiser or glide slope receiver fall into the following four categories:

(1) sinusoidal type signals occurring as a result of the aircraft responding to beam noise;
(2) sinusoidal type signals occurring as a result of the aircraft being deflected by wind gusts;
(3) steady signals occurring as a result of the aircraft being deflected by wind shears; and
(4) ramp signals occurring as a result of auto-pilot failures.

Error signals falling into categories (1), (2) and (3) above occur as a result of the auto-pilot controlled aircraft correctly responding to the described disturbances; error signals in category (4) occur as a result of auto-pilot failure causing the aircraft to fly along a course which diverges from the required approach path and, in consequence, the error with respect to the beam will continuously increase. In order to draw attention to this particular type of failure it is desirable to provide an instrument which, in addition to indicating the normal beam error signals which occur during normal operation of the auto-pilot, will give a special indication, preferably an augmented deflection, in the event of failure of the auto-pilot thereby providing an immediate warning to the human pilot.

From a knowledge of the noise spectra of actual radio beams, of the amplitudes of normal wind disturbances, and of the characteristics of the aircraft, it is possible to predict amplitude and frequency limits for the signals in categories (1), (2) and (3) above to within a high degree of probability. That is to say, it is known that under normal conditions, with all the apparatus functioning correctly, the signals falling in categories (1), (2) and (3) are exceedingly unlikely to occur outside certain limiting combinations of amplitude and frequency. It follows that it can be predicted to the same degree of probability that if a beam error signal occurs outside these limits it may be concluded that the signal is in category (4) above; that is to say, it is due to an auto-pilot failure. The principal object of the invention is to provide the means by which an augmenting signal is automatically added to the normal beam error signal supplied to the display instrument in case of auto-pilot failure, so that the suddenly increased deflection of the display instrument will provide a warning to the human pilot.

As broadly claimed, the invention consists of an approach and landing system for aircraft having an indicating instrument comprising means to generate an augmented beam error signal, and a threshold switching device responsive to the beam error signal to switch the augmented signal to the indicating instrument when the beam error signal exceeds a predetermined threshold value.

Preferably the signal applied to the threshold switching device is the beam error signal modified by the addition of a time integral term. The augmented beam error signal may also be modified by the addition of a time integral term.

One form of the invention will now be described, by way of example, with reference to the accompanying drawings, in which:

FIGURE 1 is a block schematic diagram of one form of the invention; and
FIGURE 2 shows the circuitry of the blocks 16 and 19 of FIGURE 1.

Referring to FIGURE 1 there is shown in diagrammatic form a typical network for achieving the object of the invention. The beam error signal from the localizer or glide slope receiver is transmitted along the line 11 and thence via a line 12 to the display instrument 13, which provides a deflection signal diagrammatically indicated at 14. The beam error signal from the line 11 is also applied via a line 15 to a unit 16 which generates a signal corresponding to $$\frac{K_1 e}{1+ST_1}$$

where $K_1$ is an amplification factor and $e$ is the beam error signal and the term $ST_1$ represents a time integral of the beam error signal. When a signal is operated on by a transfer-function signal of the form $$\frac{K}{1+ST}$$

the signal is amplified $K$ times and is delayed by time $T$. Where the signal is sinusoidal in form, the effect of the delay term is to attenuate the signal amplitude by a factor which is a function of $T$ and the signal frequency.

The signal generated by the unit 16 is applied to the winding 17 of a relay. The beam error signal from the line 11 is also applied via a line 18 to a unit 19 which generates a signal of the form $$\frac{K_2 e}{1+ST_2}$$

where $K_2$ is an augmented beam error signal (i.e. an amplified version of the signal $K_1$) and the term $ST_2$ represents a time integral of the error signal. The integral terms $ST_1$ and $ST_2$ represent the "lagging" referred to earlier.

FIGURE 2 shows the circuitry of the unit 16, which is identical with that of the unit 19 except that the component values are different. As shown in FIGURE 2, the unit 16 comprises an input resistor R1 having the line 15 connected to its one end hand having it other end connected to a junction to which one end of a resistor R2, one end of a capacitor C1 and the input of a D.C. amplifier are connected. The other end of R2, the other end of C1 and the output of the D.C. amplifier are connected together and to a lead which is connected to the relay winding 17. The term $K_1$ is proportional to the ratio $R_2/R_1$ while the time constant $T_1$ is dependent upon $R_2C_1$. In the case of the unit 19, $K_2$ is also dependent upon $R_2/R_1$ and the time constant $T_2$ is also given by the product $R_2C_1$ but the component values are different.

In operation, the beam error signal arriving over the line 11 is applied via the line 12 to the display instrument 13 to cause a deflection of the pointer (or other indicator) 14 which is proportional to the beam error signal. If the beam error signal on the line 11 occurs outside the limiting combinations of amplitude and frequency the signal generated by the unit 16 also rises above a predetermined threshold value (which is pre-set by the values $K_1$ and $T_1$) and at this threshold value the relay 17 is operated. Operation of the relay closes relay contacts 20 so that the augmented signal generated by the unit 19 is applied via a line 21 to the instrument 13 and causes it to produce a substantially increased deflection. The sudden increases in the deflection provides a clear warning to the pilot that the auto-pilot is not functioning.

The instrument deflection now comprises a short term beam error component plus a long term beam error component. The sensitivity to short term errors is still unity, whereas the sensitivity to long term errors is now increased from unity to $(1+K_2)$.

Only the sensitivity to signals in category (4) is normally increased by the factor $(1+K_2)$, the sensitivity to signals in categories (1) to (3) occurring simultaneously with the category (4) signal being unchanged, both before and after the threshold is exceeded, with the exception of sensitivity to sustained signals in category (3).

It will, of course, be understood that the relay 17 with its contacts 20 may be replaced by an electronic relay system.

I claim:

1. An approach and landing system for aircraft having an indicating instrument comprising means to generate an augmented beam error signal and a threshold switching device responsive to the beam error signal to switch the augmented signal to the indicating instrument when the beam error signal exceeds a predetermined threshold value.

2. A system as claimed in claim 1 in which the signal applied to the threshold switching device is the beam error signal modified by the addition of a time integral term.

3. A system as claimed in claim 2 in which the threshold switching device generates a signal corresponding $$\frac{K_1 e}{1+ST_1}$$

where $K_1$ is an amplification factor, $e$ is the beam error signal and the term $ST_1$ represents a time integral of the beam error signal.

4. A system as claimed in claim 1 in which the augmented beam error signal is the beam error signal modified by the addition of a time integral term.

5. A system as claimed in claim 3 in which the means to generate an augmented beam error signal generates a signal corresponding to $$\frac{K_2 e}{1+ST_2}$$

where $K_2$ is an amplification factor and is greater than $K_1$, and the term $ST_2$ represents the time integral of the error signal, the augmented signal being added to the instrument deflection signal.

6. A system as claimed in claim 5 in which the unit comprises a resistor R1 in series with a parallel combination of a resistor R2, a capacitor C and a D.C. amplifier, in which the term $K_1$ or $K_2$ is proportional to the ration $R_2/R_1$ while the time constant $T_1$ or $T_2$ is dependent upon the term $R_2C$.

7. An approach and landing system for aircraft comprising, in combination, an indicating instrument,
a conductor connected to said instrument for applying a beam error signal thereto whereby said instrument normally effects a display proportioned to the beam error,
and means for applying to said instrument an augmented beam error signal whereby the instrument suddenly effects an exaggerated display in response to autopilot failure, said means including a lag circuit connected to said conductor and having a signal output of the form $$\frac{K_1 e}{1+ST_2}$$

where $K_1$ is a constant of amplification, $e$ is the beam error signal and $ST_1$ is a time integral of the beam error signal.

8. The approach and landing system according to claim 7 wherein said means also includes a lag circuit connected to said conductor and having said augmented beam error signal as an output of the form $$\frac{K_2 e}{1+ST_2}$$

where $K_2$ is a constant of amplification and is greater than $K_1$, and $ST_2$ is a time integral of the beam error signal.

9. The approach and landing system according to claim 8 wherein said means comprises a pair of circuits, each having a resistor in series with a parallel combination of a resistor, a capacitor and a D.C. amplifier.

10. The approach and landing system according to claim 1 wherein said threshold switching device comprises a resistor in series with a parallel combination of a resistor, a capacitor and a D.C. amplifier.

11. The approach and landing system according to claim 10 wherein said means to generate an augmented beam error signal comprises a resistor in series with a parallel combination of a resistor, a capacitor and a D. C. amplifier.

12. The approach and landing system according to claim 1 wherein said means to generate an augmented beam error signal comprises a resistor in series with a parallel combination of a resistor, a capacitor and a D.C. amplifier.

13. An approach and landing system for aircraft comprising, in combination, an instrument for displaying beam error,
means for applying a beam error signal to said instrument whereby the instrument normally effects a display in proportion to the beam error,
normally open switch means for monitoring the beam error signal and adapted to be closed responsive to a time integral of the beam error signal which exceeds a predetermined value,
and means for applying an augmented beam error signal to said instrument through said normally open switch means whereby the instrument suddenly effects an exaggerated display when said time integral of the beam error signal exceeds said predetermined value.

14. The approach and landing system according to claim 13 wherein said normally open switch means includes a lag circuit in the form of a resistor in series with a parallel combination of a resistor, a capacitor and a D.C. amplifier.

15. The approach and landing system according to claim 14 wherein said means for applying an augmented beam error signal includes a lag circuit in the form of a resistor in series with a parallel combination of a resistor, a capacitor and a D.C. amplifier.

16. The approach and landing system according to claim 14 wherein said normally open switch means also includes a normally open switch adapted to be closed in response to a predetermined output value of said lag circuit.

17. The approach and landing system according to claim 13 wherein said means for applying an augmented beam error signal includes a lag circuit in the form of a resistor in series with a parallel combination of a resistor, a capacitor and a D.C. amplifier.

References Cited

UNITED STATES PATENTS 3,055,214   9/1962   McLane _____ 73—179 XR
3,322,939   5/1967   Curties et al. _____ 340—27 XR ALVIN H. WARING, Primary Examiner U.S. Cl. X.R.

73—178; 235—150.22; 343—108